(12) United States Patent
Zeng et al.

(10) Patent No.: US 9,313,216 B2
(45) Date of Patent: Apr. 12, 2016

(54) METHOD AND SYSTEM FOR MONITORING APPLICATION PROGRAM OF MOBILE DEVICE

(71) Applicant: BEIJING NETQIN TECHNOLOGY CO., LTD., Beijing (CN)

(72) Inventors: Yang Zeng, Beijing (CN); Huaguo Shi, Beijing (CN); Wei Yang, Beijing (CN); Yaowei Chen, Beijing (CN); Yu Lin, Beijing (CN); Shihong Zou, Beijing (CN)

(73) Assignee: Beijing Netqin Technology Co., Ltd., Beijing (CN)

( * ) Notice: Subject to any disclaimer, the term of this patent is extended or adjusted under 35 U.S.C. 154(b) by 27 days.

(21) Appl. No.: 14/129,762

(22) PCT Filed: Nov. 9, 2012

(86) PCT No.: PCT/CN2012/084371
§ 371 (c)(1),
(2) Date: Dec. 27, 2013

(87) PCT Pub. No.: WO2013/071841
PCT Pub. Date: May 23, 2013

(65) Prior Publication Data
US 2014/0242945 A1    Aug. 28, 2014

(30) Foreign Application Priority Data

Nov. 15, 2011    (CN) .......................... 2011 1 0360808

(51) Int. Cl.
*G06F 21/00*    (2013.01)
*H04L 29/06*    (2006.01)
*G06F 21/53*    (2013.01)

(52) U.S. Cl.
CPC ............ *H04L 63/1408* (2013.01); *G06F 21/53* (2013.01); *H04L 63/168* (2013.01)

(58) Field of Classification Search
None
See application file for complete search history.

(56) References Cited

U.S. PATENT DOCUMENTS 8,112,262 B1 * 2/2012 Michelsen .......... G06F 11/3688
703/13
8,296,445 B1 * 10/2012 Hackborn et al. ............ 709/228

(Continued)

FOREIGN PATENT DOCUMENTS

| CN | 101645119 A | 2/2010 |
| CN | 102135892 A | 7/2011 |
| CN | 102693394 A | 9/2012 |

OTHER PUBLICATIONS

International Search Report, dated Feb. 14, 2013, for corresponding International Application No. PCT/CN2012/084371, 4 pages.

*Primary Examiner* — Abu Sholeman
*Assistant Examiner* — Maung Lwin
(74) *Attorney, Agent, or Firm* — Seed IP Law Group PLLC (57) ABSTRACT

The present disclosure provides a method and system for monitoring an application. The method includes creating a simulated system service; establishing a connection with a function in a device driver that manages an Input/Output (I/O) channel of the device; intercepting data transmitted from the application to the function in the device driver that manages the I/O channel of the device; replacing, based on the intercepted data, a system service requested by the application with a corresponding simulated system service; and recording a request received by the simulated system service and forwarding the request to an analysis module for analysis.

7 Claims, 6 Drawing Sheets

(56) References Cited

U.S. PATENT DOCUMENTS

| | | | |
|---|---|---|---|
| 8,924,192 B1* | 12/2014 | Poulin | 703/13 |
| 2002/0066034 A1* | 5/2002 | Schlossberg | G06F 21/552 726/23 |
| 2002/0116234 A1* | 8/2002 | Nagasawa | G06Q 10/02 705/5 |
| 2005/0108021 A1* | 5/2005 | Anderson | H04L 41/5054 709/205 |
| 2005/0137838 A1* | 6/2005 | Medlyn | 703/13 |
| 2007/0101435 A1 | 5/2007 | Konanka et al. | |
| 2007/0281623 A1* | 12/2007 | Liu | 455/67.11 |
| 2008/0021693 A1* | 1/2008 | Campbell et al. | 703/21 |
| 2010/0100962 A1* | 4/2010 | Boren | H04L 63/1433 726/25 |
| 2011/0071811 A1* | 3/2011 | Kuehr-McLaren | G06Q 10/04 703/13 |
| 2011/0122776 A1* | 5/2011 | Jacob et al. | 370/250 |
| 2011/0161484 A1* | 6/2011 | Van den Bogaert et al. | 709/224 |
| 2012/0180022 A1* | 7/2012 | Hopkins | G06F 8/30 717/100 |
| 2012/0317555 A1* | 12/2012 | Aluru et al. | 717/134 |

\* cited by examiner

METHOD AND SYSTEM FOR MONITORING APPLICATION PROGRAM OF MOBILE DEVICE

TECHNICAL FIELD

The present disclosure relates to communication security, and more particularly, to a method and system for monitoring an operation of an application in an Android operating system.

BACKGROUND

Mobile devices, such as smart phones and tablet computers, have become a main platform for development of various applications and provide the basis for mobile software and Internet industries. With the development of the mobile communication industry, users of mobile devices now have more freedom in selection and installation of application software, such that user experiences provided by the mobile devices will better satisfy the requirement of user personalization. However, in a mobile application system, it is inevitable that a user may be provided with virus programs or malicious software containing virus programs, in addition to non-malicious mobile application software. In contrast to desktop operating systems for conventional personal computers, in a mobile application platform, such as an Android operating system, its system kernel is locked or it is very difficult for developers to monitor and control operations of other applications using traditional virus detection techniques.

Some solutions have been proposed. For example, US Patent Application Publication No. 2011/0047597, titled "SYSTEM AND METHOD FOR SECURITY DATA COLLECTION AND ANALYSIS", filed on Aug. 25, 2010, discloses a technique for virus detection. According to this technique, a software client in a mobile device transmits data associated with an application to a server which then analyzes the application in various aspects and returns an analysis result to the mobile device. However, this technique is restricted in that it cannot catch up with the development of mobile applications. As processing capabilities of the mobile devices gradually improve, capacities of the mobile applications also increase. While the analysis at the server does not waste any computing resource in the processor of the mobile device, some wireless transmission traffic of the mobile device will be needed for transmission of a large amount of application data. In this case, a certain period of time will be wasted and possibly the user will be charged for the traffic consumed. Further, this process is only effective when an application is being installed or when all the applications are being scanned, i.e., it applies no restriction on operations of the applications which have already been installed.

As discussed above, it is not possible in the prior art to efficiently monitor the operations of mobile applications in real time. The existing solution is dependent on operations at the server and thus on known virus and malicious software libraries and cannot work on new malicious software and viruses, which limits the application of the technique.

SUMMARY

It is an object of the present disclosure to provide a method and system for monitoring an application in a mobile device, capable of breaking through the restriction of application interface in a mobile operating system and intercepting malicious behaviors using the underlying communication mechanism. In this way, the real time monitoring can be achieved without depending on the resources at the server.

According to an aspect of the present disclosure, a method for monitoring an application in a mobile device is provided. The method comprises the following steps of: creating a simulated system service; establishing a connection with a function in a device driver that manages an Input/Output (I/O) channel of the device; intercepting data transmitted from the application to the function in the device driver that manages the I/O channel of the device; replacing, based on the intercepted data, a system service requested by the application with a corresponding simulated system service; transmitting the data request to the simulated system service; and recording a request received by the simulated system service and forwarding the request to an analysis module for analysis.

According to another aspect of the present disclosure, the step of recording the request received by the simulated system service comprises: creating a proxy service between a service at a system layer and a service at an application layer; registering an application service in the proxy service; and converting the request recorded by the simulated system service at the system layer into a request visible at the application layer.

According to another aspect of the present disclosure, the step of intercepting data transmitted from the application to the function in the device driver that manages the I/O channel of the device comprises: reading the data from a data reception buffer in a system driving device for communication between system processes.

According to another aspect of the present disclosure, the system driving device for communication between system processes is a binder kernel driving device in an Android operating system.

According to another aspect of the present disclosure, the analysis module presents the request visible at the application layer to a user and prompts the user to select to authorize or prohibit an operation associated with the request.

According to another aspect of the present disclosure, when the user selects to authorize the operation, the request visible at the application layer along with an authorization instruction is converted into a request for the simulated system service at the system layer, so as to cause the corresponding system service to execute the operation associated with the request; or, when the user selects to prohibit the operation, the operation is terminated.

According to another aspect of the present disclosure, the method further comprises: creating a user rule database and storing a name of the application, a type of the operation and a selection by the user in the user rule database.

According to another aspect of the present disclosure, the method further comprises: searching, by the analysis module after receiving the request visible at the application layer, the user rule database for a user rule associated with the application and automatically authorizing or prohibiting the operation associated with the request based on the user rule.

According to another aspect of the present disclosure, a system for monitoring an application in a mobile device is provided. The system comprises a client installed in the mobile device. The client comprises a simulated system service module, a function hook module, a proxy service module, an analysis module and a user rule database. The simulated system service module corresponds to a system service module in an operating system of the mobile device. The function hook module, communicative with a kernel of the operating system of the mobile device, establishes a connection with a function in a device driver that manages an Input/Output (I/O) channel of the device, intercepts data transmitted from the application to the function in the device driver that manages the I/O channel of the device, and forwards, based on the intercepted data, a system service requested by the application to the corresponding simulated system service module. The proxy service module, communicative with the simulated system service module, communicates between a service at a system layer and a service at an application layer and converts the request recorded by the simulated system service at the system layer into a request visible at the application layer. The analysis module, communicative with the proxy service module and the user rule database, reads an operation requested by the application, and authorizes or prohibits the operation requested by the application based on a rule stored in the user rule database or based on a selection by a user in response to a prompt.

According to another aspect of the present disclosure, when the analysis module authorizes the operation requested by the application, the proxy service module converts the request visible at the application layer along with an authorization or prohibition instruction into a request for the simulated system service at the system layer, so as to cause the corresponding system service to execute the operation associated with the request; or when the analysis module prohibits the operation requested by the application, the operation is terminated.

The present disclosure is advantageous in that the lock of the system kernel by the Android operating system can be effectively bypassed.

The present disclosure is also advantageous in that the application can be monitored in real time and the local resources at the mobile device can be fully utilized.

BRIEF DESCRIPTION OF THE DRAWINGS

In the following, the present disclosure will be further detailed with reference to the figures, in which.

DETAILED DESCRIPTION

The present disclosure provides a method and system for monitoring an application in a mobile device, allowing virus monitoring software of the mobile device to monitor the operation of the application via the kernel of the operating system of the mobile device. In this way, the application can be monitored in real time and the local resources at the mobile device can be fully utilized.

Figure 1:
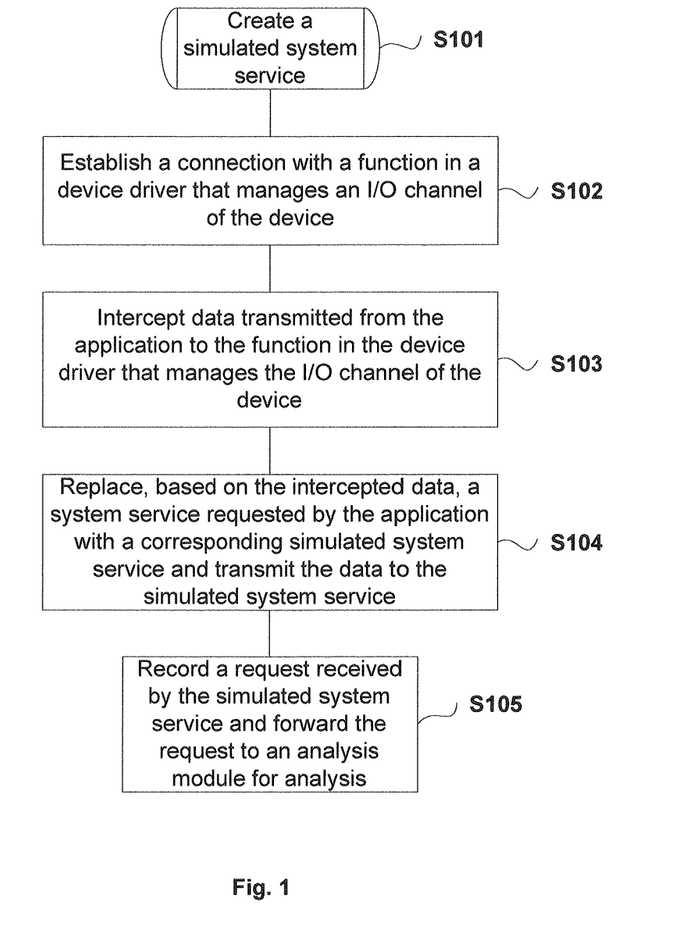
FIG. 1 is a flowchart illustrating a method for monitoring an application in a mobile device according to the present disclosure.

According to an embodiment of the present disclosure, a method for monitoring an application in a mobile device is provided. In the following, a process in which client software monitors an application in an Android system will be explained in detailed in an exemplary context of an Android operating system platform. FIG. 1 is a flowchart illustrating a method for monitoring an application in a mobile device according to the present disclosure. As shown in FIG. 1, at step S101, a simulated system service is created. In this example, the simulated system service is a system service in a simulated Android operating system, such as a Short Message Service (SMS) system service, "ISms" or a telephony system service, "ITelephony". The simulated system service includes functions in the original system service and is further provided with a particular function for storing and forwarding a request content and invoking the corresponding system service. The simulated system service has been registered in a service manager and is activated when the system is started.

At step S102, a connection is established with a function in a device driver that manages an Input/Output (I/O) channel of the device. In the Android operating system, the function in the device driver that manages the I/O channel of the device is the Ioctl function. Establishing a connection with the function means monitoring the invoking of the function in real time. Typically, the Ioctl function being invoked implies a request sent by the application for a system service.

At step S103, data transmitted from the application to the function in the device driver that manages the I/O channel of the device is intercepted. According to an embodiment of the present disclosure, as shown in step S304 (referring to FIG. 3 which will be described later), a Binder object transmitted by the application is intercepted and parsed to obtain a request data which is then stored at a particular buffer address. For example, as shown in FIG. 4, the application transmits an instruction for sending a SMS message, including data such as a sender number, a receiver number and a message content. The data is transmitted from the application to the system layer and the SMS system service, ISms, will be invoked by the Binder object. At the system layer, the system service and data corresponding to the Binder pointer can be obtained by reading a buffer address specific to the Binder object.

At step S104, a system service requested by the application is replaced with a corresponding simulated system service based on the intercepted data. As shown in FIG. 4, the request destined to the SMS system service, ISms, can be intercepted by replacing the Binder pointer in the data. Then the request is transmitted to a simulated SMS system service, SISms. At step S105, the request received by the simulated system service is recorded and forwarded to an analysis module for analysis.

Figure 2:
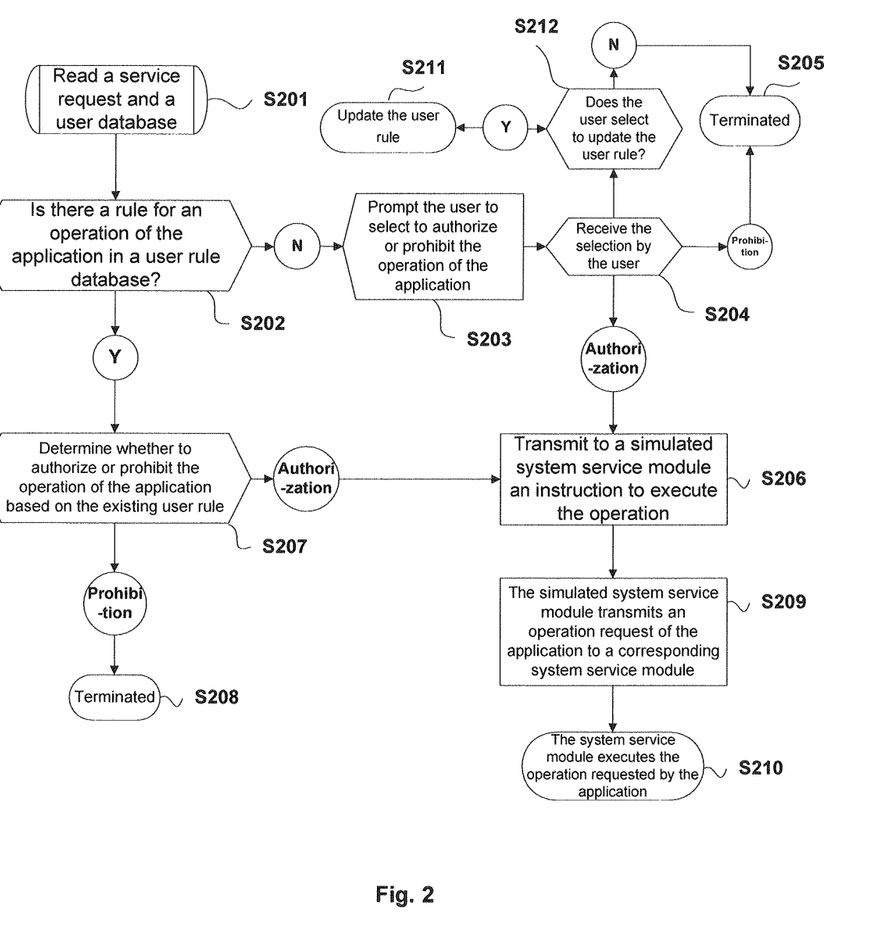
FIG. 2 is a flowchart illustrating a process for analyzing the application in the method according to the present disclosure.

The process flow shown in FIG. 2 describes a process in which the analysis module analyzes the behavior of the application. At step S201, a service request is read and a user database is read. The read service request is the request received by the simulated system service in step S105 of FIG. 1. The user database can be a local database at the mobile device which can be read and searched by a program at the application layer. Alternatively, the user database can be a database at a server. In this case, the mobile device can submit a service request data packet to the server over a mobile communication connection such as GPRS, WCDMA or Wireless LAN and the server returns a search result to the mobile device.

At step S202, it is determined whether there is a rule for an operation of the application in a user rule database. If there is no rule for the operation of the application in the user rule database, then at step S203, the user is prompted to select to authorize or prohibit the operation of the application. The user can be prompted by displaying a pop-up dialogue box on a screen that provides option buttons to be selected by the user. At step S204, the selection by the user is received. If the user selects to prohibit the operation, then the analysis process ends at step S205. If the user selects to authorize the operation, then at step S206, an instruction to execute the operation is transmitted to a simulated system service module. At step S212, it is determined whether the user selects to update the user rule. If the user selects to update the user rule, then at step S211, the user selection is stored in the user rule database. If the selects not to update the user rule, then the analysis process ends at step S205. At step S209, the simulated system service module transmits an operation request of the application to a corresponding system service module. At step S210, the system service module receives and executes the particular operation requested by the application.

When the analysis module finds a rule for the operation of the application in the user rule database, at step S207, it determines whether to authorize or prohibit the operation of the application based on the existing user rule. If it is determined to authorize the operation, the process proceeds with step S206; if it is determined to prohibit the operation, the analysis process ends at step S208. At steps S208 and S205, since the request content transmitted from the application to the Binder driving device has been intercepted and the Binder pointer has been converted to point to the simulated system service, the request content will not be received by the corresponding system service. That is, since the operations in the steps S206 and S209 are not performed, the operation requested by the application will not be executed. In this way, the malicious operation of the application, such as sending a charged SMS message or dialing a charged phone number in background, can be blocked.

Figure 3:
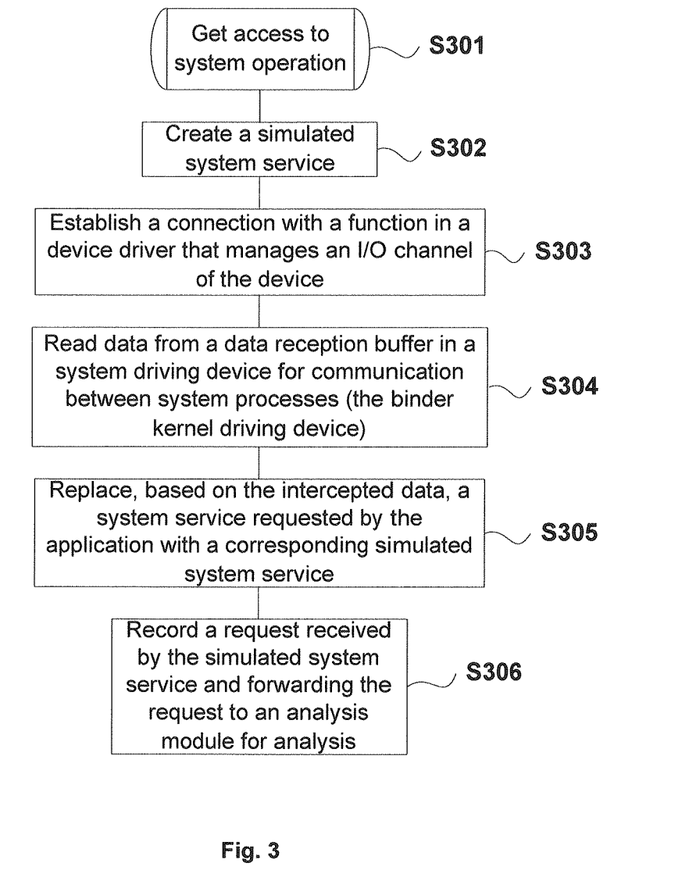
FIG. 3 is a flowchart illustrating a process for monitoring the application in the method according to the present disclosure.
Figure 4:
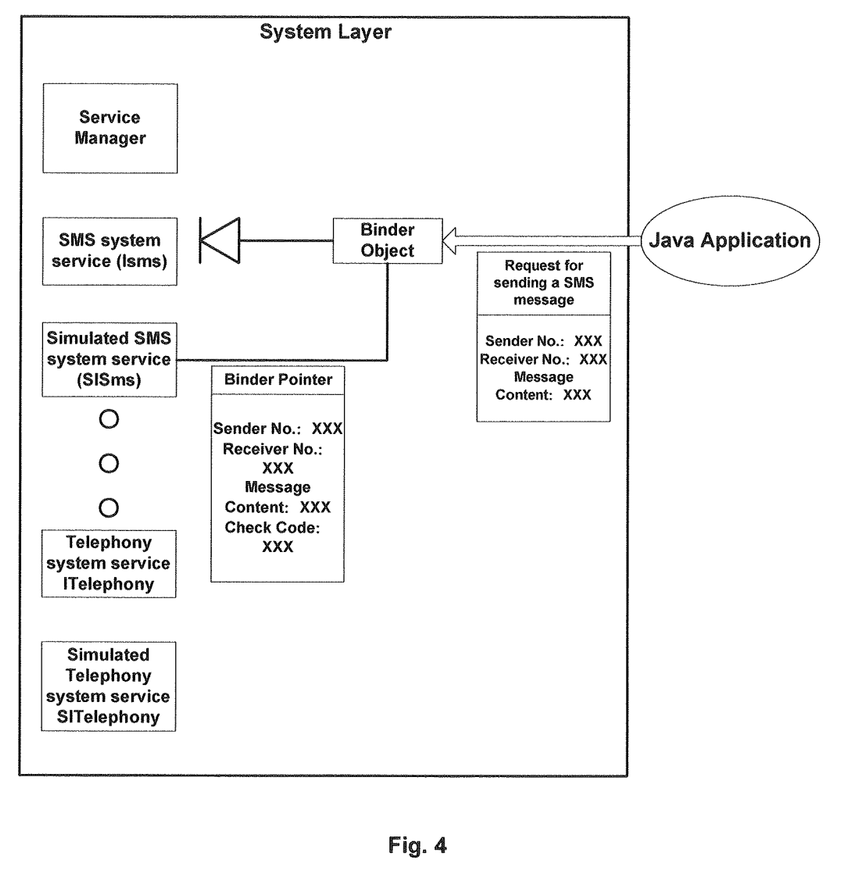
FIG. 4 is a flowchart illustrating a process for obtaining a system service request and related data in the method according to the present disclosure.

FIG. 3 is a flowchart illustrating a process for monitoring the application in the method according to the present disclosure. As shown in FIG. 3, the process for monitoring the application in the mobile device starts with step S301 in which a client gets access to system operation, e.g., by invoking the "su" system command to ask the user for the "root" access or actively utilizing a relevant system bug to crack the system so as to get the "root" access. The subsequent operations are the same as those shown in FIG. 1. Additionally, the process for monitoring the application as shown in FIG. 3 is different from the process shown in FIG. 1 in that, at step S304, the data is read from a data reception buffer in a system driving device for communication between system processes (the binder kernel driving device).

FIG. 4 is a flowchart illustrating a process for obtaining a system service request and related data in the method according to the present disclosure. FIG. 4 shows a process in which a request from a Java application is processed at the system layer of an Android operating system. The Java application transmits a request for sending a SMS message, a telephone number and a message content to the system layer. The Binder object receives and processes the request from the application layer. There are several conversions during the processing of data flow, including for example: 1) a conversion from Java virtual machine to a C++ space of a Linux system, which is a mapping process for an object achieved by locally invoking the ENV instruction by Java; 2) a transfer from the C++ space to a kernel Binder device, which is done using ProcessState class; 3) a step in which the system service reads data from the Binder device in the kernel. According to an embodiment of the present disclosure, subsequent to the above step 2) but prior to the step 3), a service request can be read from the system buffer corresponding to the Binder device and the Binder pointer for the service request can be modified, such that the service request can be interrupted prior to the above step 3) and received, recorded and forwarded by the simulated system service instead. For example, the SMS service request shown in FIG. 4 is intended to be received and processed by the system service ISms originally. However, with the operations according to the present disclosure, the Binder pointer for the service request is modified such that the service request is received by the simulated system service SISms. The above steps have a function similar to the hook program.

Figure 5:
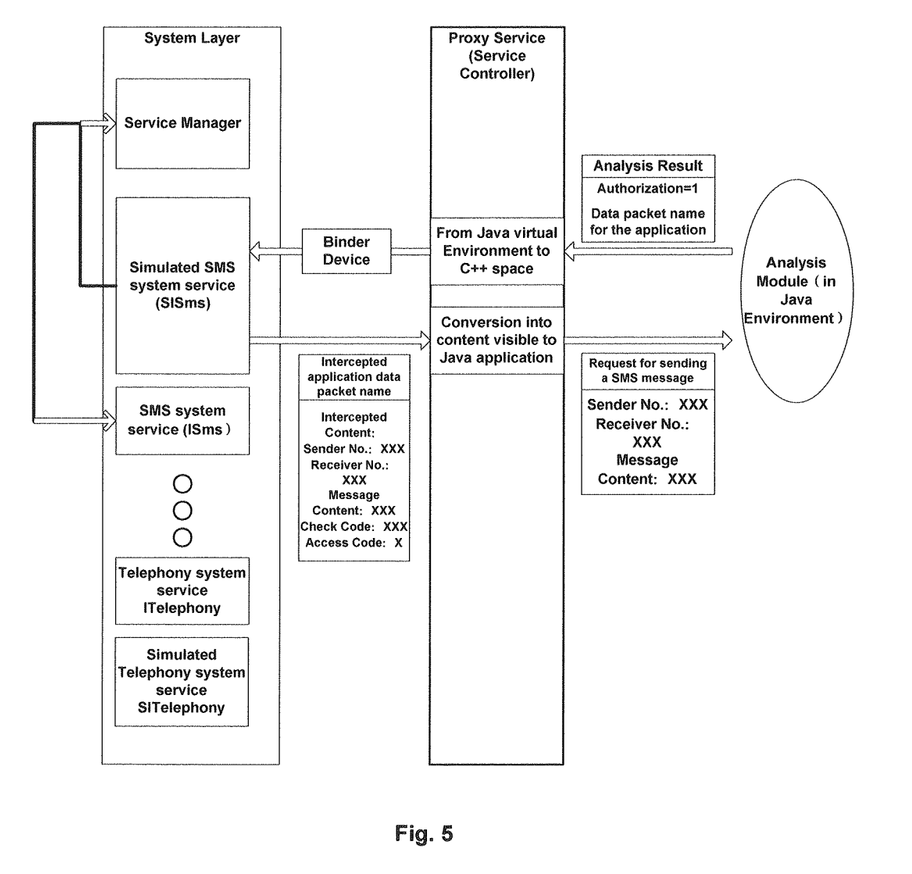
FIG. 5 is a flowchart illustrating a process in which a proxy service converts the system service request in the method according to the present disclosure.

FIG. 5 illustrates the communication process between the simulated system service and the analysis module in detail. As shown, the simulated SMS system service, SISms, receives a request for sending a SMS message from an application and transmits the data associated with the request (including data packet name, sender number, receiver number, message content and access number (e.g., "0" represents SMS access)) to a proxy service. The proxy service than converts the data into a content visible to the Java application and transmits it to the analysis module. If the output from the analysis module is to authorize the operation associated with the request, the analysis module transmits the analysis result to the proxy service, which may contain a data packet name for the application, a request for a simulated SMS service and a value of the analysis result (e.g., "authorize"=1). This request is also converted from the Java virtual machine to the C++ space and then injected from the C++ space into the Binder device. The hook-like program in the Binder device will not intercept or modify any request associated with a simulated system service. Since the simulated system service has obtained an Ibinder pointer for the corresponding system service before the service is replaced by a hook, the simulated system service can find the corresponding system service directly based on the pointer. Therefore, an instruction associated with the analysis result reaches the simulated SMS system service. The simulated SMS system service reads the instruction associated with the analysis result and, if the instruction indicates an authorization, then transmits the request to the corresponding SMS system service based on the Ibinder pointer for the corresponding SMS service as previously stored. The SMS system service receives the request for sending a message and executes the associated operation.

Figure 6:
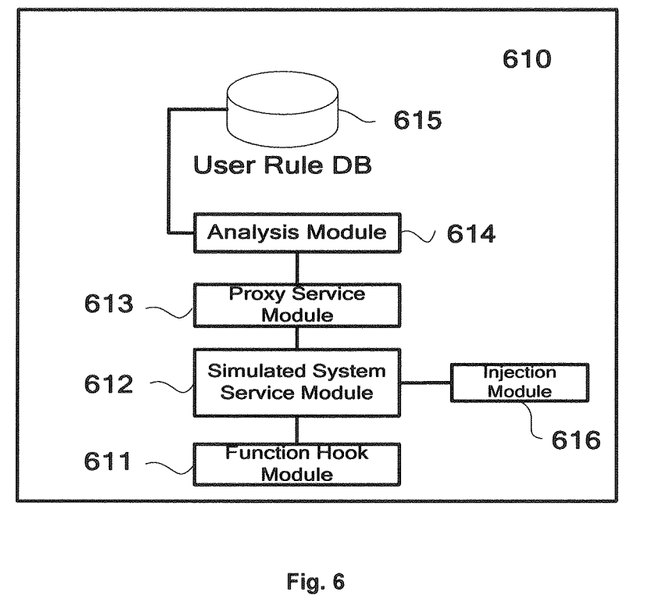
FIG. 6 is a block diagram of a system in which the method for monitoring an application in a mobile device can be applied according to the present disclosure.

FIG. 6 is a block diagram of a system in which the method for monitoring an application in a mobile device can be applied according to the present disclosure. As shown in FIG. 6, the system for monitoring an application in a mobile device includes a client module 610. The client module 610 includes a function hook module 611, a simulated system service module 612, a proxy service module 613, an analysis module 614, a user rule database 615 and an injection module 616.

The injection module 616 is configured to inject the function hook module 611, the simulated system service module 612 and the proxy service module 613 into a system process "ServiceManager" and activate these services when the system is started. The injection and activation of these services are mainly done when the programs are initially executed or each time the system is started.

The simulated system service module 612 corresponds to a system service module in an operating system of the mobile device. It has a function similar to that of the system service module and is registered in a system service manager.

The function hook module 611 is communicative with a kernel of the operating system of the mobile device and configured to: establish a connection with a function in a device driver that manages an Input/Output (I/O) channel of the device, intercept a service request and related data transmitted from the application to a Binder device, and forward, based on the intercepted data, the request and the related data from the application to the corresponding simulated system service module.

The proxy service module 613 is communicative with the simulated system service module 612 and configured to: communicate between a service at a system layer (a Linux environment in an Android system) and a service at an application layer (Java virtual environment) and convert the request recorded by the simulated system service at the system layer into a request visible at the application layer.

The analysis module 614 is communicative with the proxy service module 613 and the user rule database 615 and configured to: read an operation requested by the application, and authorize or prohibit the operation requested by the application based on a rule stored in the user rule database 615. When the analysis module 614 authorizes the operation requested by the application, the proxy service module 613 converts the request visible at the application layer along with an authorization instruction into a request visible to the simulated system service at the system layer, such that the corresponding system service module can execute the requested operation. When the analysis module 614 prohibits the operation requested by the application, the operation is terminated.

The present disclosure has been described with reference to the above apparatus and method. However, the apparatus and method described above are not an exhausted list of all possible combinations. It can be appreciated by those skilled in the art that further combinations and modifications can be made to the present disclosure. Therefore the present disclosure intends to cover all such modifications, alternations and variants. For example, the present disclosure is not limited to the SMS system service request, but is also applicable to monitoring other forms of requests, such as a request for making a call or a request for making a multi-media record. Further, while a particular feature of the present disclosure may have been disclosed in connection with one of the embodiments, it is possible that the feature can be combined with other features described in other embodiments.

The invention claimed is:

1. A method for monitoring an application in a mobile device, comprising the following steps of:
   a) creating a simulated system service;
   b) establishing a connection with a function in a device driver that manages an Input/Output (I/O) channel of the mobile device;
   c) intercepting data transmitted from the application to the function in the device driver that manages the I/O channel of the mobile device;
   d) replacing, based on the intercepted data, a system service requested by the application with a corresponding simulated system service and transmitting the data to the simulated system service;
   e) recording a request by the application received by the simulated system service and forwarding the request to an analysis module for analysis;
   wherein step e) further includes creating a proxy service between a service at a system layer and a service at an application layer,
   registering an application service in the proxy service, and converting the request recorded by the simulated system service at the system layer into a request visible at the application layer;
   f) creating a user rule database and storing a name of the application, a type of the operation and a selection by the user in the user rule database; and
   g) searching, by the analysis module after receiving the request visible at the application layer, the user rule database for a user rule associated with the application and automatically authorizing or prohibiting an operation associated with the request based on the user rule.

2. The method of claim 1, wherein the step c) comprises:
   reading the data from a data reception buffer in a system driving device for communication between system processes.

3. The method of claim 2, wherein the system driving device for communication between system processes is a binder kernel driving device in an Android operating system.

4. The method of claim 1 further comprising:
   presenting, by the analysis module, the request visible at the application layer to a user and prompting the user to select to authorize or prohibit an operation associated with the request.

5. The method of claim 4, further comprising:
   converting, when the user selects to authorize the operation, the request visible at the application layer along with an authorization instruction into a request for the simulated system service at the system layer, to cause the corresponding system service to execute the operation associated with the request; or
   terminating the operation when the user selects to prohibit the operation.

6. A system for monitoring an application in a mobile device, comprising a client installed in the mobile device, the client comprising a simulated system service module, a function hook module, a proxy service module, an analysis module and a user rule database, wherein:
   the simulated system service module corresponds to a system service module in an operating system of the mobile device;
   the function hook module, communicative with a kernel of the operating system of the mobile device, establishes a connection with a function in a device driver that manages an Input/Output (I/O) channel of the mobile device, intercepts data transmitted from the application to the function in the device driver that manages the I/O channel of the mobile device, and forwards, based on the intercepted data, a system service requested by the application to the corresponding simulated system service module;
   the proxy service module, communicative with the simulated system service module, communicates between a service at a system layer and a service at an application layer and converts the request recorded by the simulated system service at the system layer into a request visible at the application layer; and
   the analysis module, communicative with the proxy service module and the user rule database, reads an operation requested by the application, and authorizes or prohibits the operation requested by the application based on a rule stored in the user rule database or based on a selection by a user in response to a prompt presented on a screen of the mobile device.

7. The system of claim 6, wherein, when the analysis module authorizes the operation requested by the application, the proxy service module converts the request visible at the application layer along with an authorization or prohibition instruction into a request for the simulated system service at the system layer, and the simulated system service invokes the corresponding system service to execute the operation associated with the request; or
   when the analysis module prohibits the operation requested by the application, the operation is terminated and the request is not forwarded to the corresponding system service for processing, thereby blocking the request.

* * * * *